(12) United States Patent
Sasahara

(10) Patent No.: US 11,476,700 B2
(45) Date of Patent: Oct. 18, 2022

(54) POWER SUPPLY CONTROL APPARATUS

(71) Applicant: YAZAKI CORPORATION, Tokyo (JP)

(72) Inventor: Masato Sasahara, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/529,280

(22) Filed: Nov. 18, 2021

(65) Prior Publication Data

US 2022/0158481 A1  May 19, 2022

(30) Foreign Application Priority Data

Nov. 18, 2020 (JP) .............................. JP2020-191683

(51) Int. Cl.
*H02J 3/38* (2006.01)
*H02J 7/34* (2006.01)
*H02J 9/06* (2006.01)
*H02J 7/00* (2006.01)

(52) U.S. Cl.
CPC ............ *H02J 9/061* (2013.01); *H02J 7/0068* (2013.01); *H02J 7/00714* (2020.01); *H02J 2207/20* (2020.01)

(58) Field of Classification Search
CPC ...... H02J 9/061; H02J 7/0068; H02J 7/00714; H02J 2207/20; H02J 2310/46; H02J 7/342
USPC ......................................................... 307/19
See application file for complete search history.

(56) References Cited

U.S. PATENT DOCUMENTS

| | | | | |
|---|---|---|---|---|
| 2006/0097577 | A1* | 5/2006 | Kato | H02J 7/1423 307/10.1 |
| 2012/0330538 | A1* | 12/2012 | Spjuth | F02N 11/0866 701/113 |
| 2015/0203060 | A1* | 7/2015 | Kamioka | H02J 7/16 307/10.1 |
| 2018/0041048 | A1* | 2/2018 | Yang | B60R 16/03 |
| 2018/0261890 | A1* | 9/2018 | Yan | H01M 10/486 |
| 2019/0028017 | A1* | 1/2019 | Wataru | H02M 1/08 |

FOREIGN PATENT DOCUMENTS

JP         2017-63543 A     3/2017

* cited by examiner

*Primary Examiner* — Richard Tan
(74) *Attorney, Agent, or Firm* — Kenealy Vaidya LLP

(57) ABSTRACT

In a power supply control apparatus, a control unit is configured to execute: discharge control of turning off a first switch and turning on a second switch to discharge electric power from a backup power supply to a backup load; first charge control of turning on the first switch and turning off the second switch to charge the backup power supply via a charging DC/DC converter; and second charge control of turning on the first switch and turning on the second switch to charge the backup power supply via the second switch. In charging the backup power supply, the second charge control is executed only in a case in which a current value of a charging current is equal to or greater than a first predetermined value and equal to or less than a second predetermined value that is greater than the first predetermined value.

4 Claims, 5 Drawing Sheets

POWER SUPPLY CONTROL APPARATUS

CROSS-REFERENCE TO RELATED APPLICATIONS

This application is based on and claims the benefit of priority of Japanese Patent Application No. 2020-191683 filed on Nov. 18, 2020, the entire contents of which are incorporated herein by reference.

FIELD

The present disclosure relates to a power supply control apparatus.

BACKGROUND

A vehicle power supply system including a lead battery serving as a main power supply and a lithium ion battery serving as a backup power supply has been known (see, for example, JP-A-2017-063543). In the vehicle power supply system disclosed in JP-A-2017-063543, a lithium ion battery is connected to a lead battery, an alternator, a load, and a backup load via a DC/DC converter. The DC/DC converter is a bidirectional DC/DC converter that converts a voltage on the lead battery side and supplies the converted voltage to the lithium ion battery side or converts a voltage on the lithium ion battery side and supplies the converted voltage to the lead battery side by a switching operation.

SUMMARY

When a required output of the DC/DC converter increases due to an increase in a load to be driven, a cost of the DC/DC converter increases since, for example, the DC/DC converter needs to be significantly changed in structure in order to improve cooling performance of the DC/DC converter or components need to be increased in size. Here, by providing a discharge path for discharging electric power from the backup power supply side to the backup load side without using the DC/DC converter, the cost of the DC/DC converter can be reduced.

The backup power supply discharging electric power to the backup load is limited to cases such as one where a power supply failure occurs on the main power supply side. In a normal state where no power supply failure occurs on the main power supply side, the backup power supply seldom discharges electric power. Therefore, there are few opportunities to charge the backup power supply. Therefore, it is conceivable to reduce the cost by having a low-capacity DC/DC converter. However, in a case where some kind of abnormal situation occurs, the backup power supply discharges electric power, and a state of charge of the backup power supply decreases, charging through the low-capacity DC/DC converter takes a long time.

Therefore, it is conceivable to use the above-described discharge path at the time of charging the backup power supply. However, depending on a voltage on the main power supply side or an open circuit voltage of the backup power supply, a fluctuation range of a charging current may increase, and in this case, the charging current may exceed an allowable upper limit value.

The present disclosure has been made in view of the above circumstances, and an object of the present disclosure is to provide a power supply control apparatus capable of reducing a cost of a DC/DC converter and shortening charging time while safely charging a backup power supply.

The present disclosure provides a power supply control apparatus in a power supply system including a power supply unit, a main power supply, and a backup power supply, the power supply control apparatus connecting the power supply unit, the main power supply, and the backup power supply and controls charging and discharging of the backup power supply, the power supply control apparatus including: a power line to which the power supply unit, the main power supply, the backup power supply, and a backup load are connected; a first switch provided on the power line and configured to turn on and off connection between the power supply unit as well as the main power supply and the backup power supply; a second switch provided on the power line and configured to turn on and off connection between the backup power supply and the backup load; a charging DC/DC converter connected to the power line in parallel with the second switch and configured to convert a voltage supplied from a power supply unit side and supply a converted voltage to a backup power supply side; and a control unit configured to execute: discharge control of turning off the first switch and turning on the second switch to discharge electric power from the backup power supply to the backup load; first charge control of turning on the first switch and turning off the second switch to charge the backup power supply via the charging DC/DC converter; and second charge control of turning on the first switch and turning on the second switch to charge the backup power supply via the second switch, wherein in charging the backup power supply, the control unit is configured to execute the second charge control only in a case in which a current value of a charging current is equal to or greater than a first predetermined value and equal to or less than a second predetermined value that is greater than the first predetermined value.

In the present disclosure, in charging the backup power supply, the backup power supply is charged via the second switch only when the current value of the charging current is equal to or greater than the first predetermined value and equal to or less than the second predetermined value that is greater than the first predetermined value, and in other cases, the backup power supply is charged via the charging DC/DC converter. Accordingly, it is possible to reduce a cost of the DC/DC converter by not providing a discharging DC/DC converter or by making the charging DC/DC converter have a low capacity, and it is also possible to shorten the charging time while safely charging the backup power supply.

DETAILED DESCRIPTION

Figure 1:
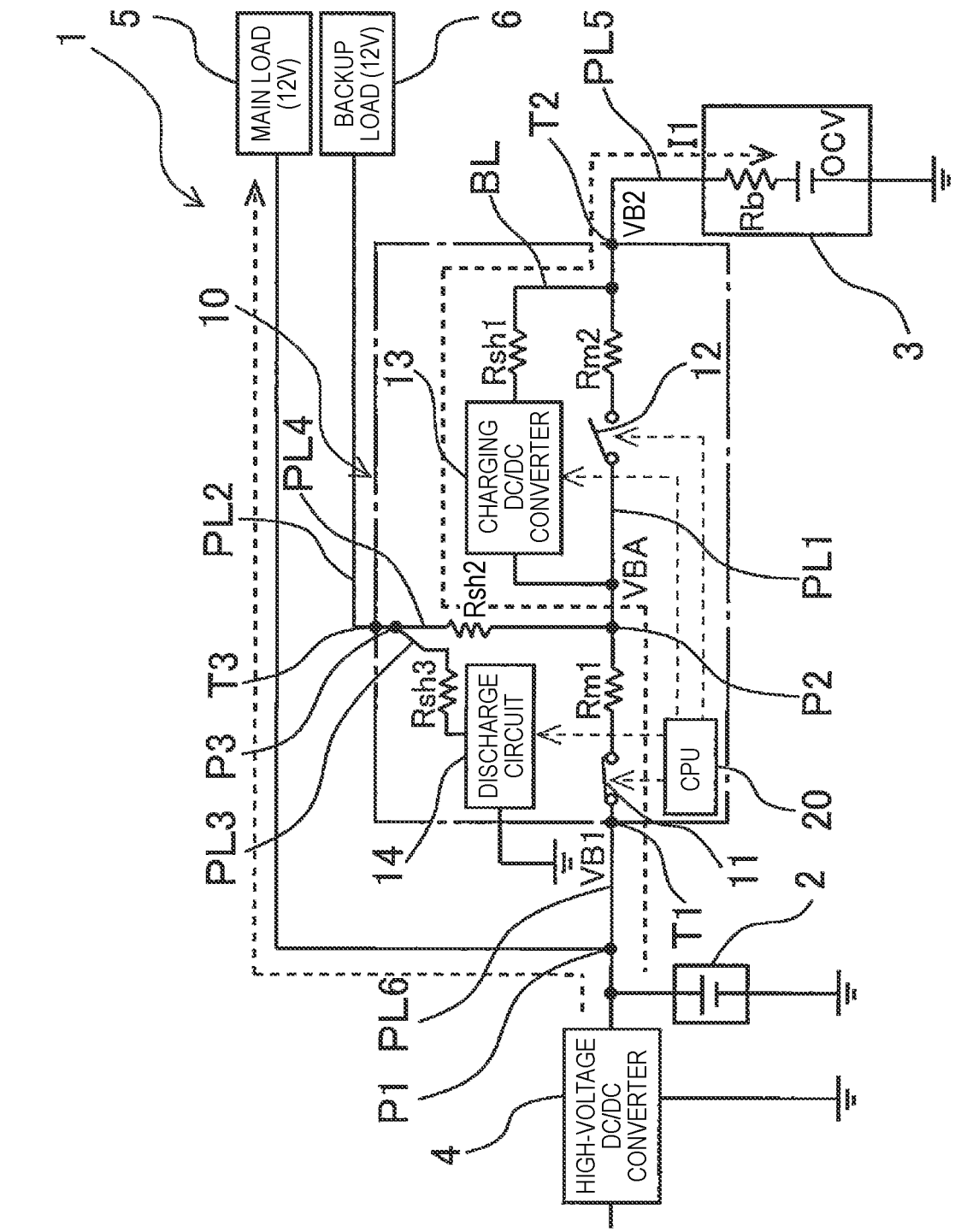
FIG. 1 is a diagram illustrating an in-vehicle power supply system including a control module according to an embodiment of the present disclosure.

Hereinafter, the present disclosure will be described in accordance with a preferred embodiment. The present disclosure is not limited to the embodiment to be described below, and can be changed as appropriate without departing from the scope of the present disclosure. Although some configurations are not illustrated or described in the embodiment to be described below, a known or well-known technique is appropriately applied to details of an omitted technique within a range in which no contradiction occurs to contents to be described below.

FIGS. 1 to 4 are diagrams illustrating an in-vehicle power supply system 1 including a control module 10 according to an embodiment of the present disclosure. As illustrated in these drawings, the in-vehicle power supply system 1 as an example of a power supply system includes a main battery 2 as an example of a main power supply, a backup battery 3 as an example of a backup power supply, a high-voltage DC/DC converter 4 as an example of a power supply unit, and a control module 10 as an example of a power supply control apparatus. In the in-vehicle power supply system 1 of the present embodiment, the main battery 2 is a regular power supply that supplies electric power to a 12V main load 5, and the backup battery 3 is an emergency power supply that supplies electric power to a 12V backup load 6. In addition, the main battery 2 of the present embodiment is a 12V lead storage battery. In contrast, the backup battery 3 of the present embodiment is a ternary lithium ion secondary battery, and has a higher rated voltage than the main battery 2.

The power supply unit includes, for example, a high-voltage power supply of 48V or the like, a generator such as an alternator, and the high-voltage DC/DC converter 4. The high-voltage DC/DC converter 4 steps down a high voltage output from the high-voltage power supply and the generator and outputs the stepped-down high voltage. The main battery 2, the main load 5, and the control module 10 are connected to a power line PL6 connected to an output terminal of the high-voltage DC/DC converter 4. A VB1 terminal T1 is provided at one end of a power line PL1 provided in the control module 10, and a VB2 terminal T2 is provided at the other end of the power line PL1. The power line PL6 is connected to the VB1 terminal T1. The backup battery 3 is connected to the VB2 terminal T2 by a power line PL5. In addition, the backup load 6 is connected to the power line PL1.

As illustrated in FIG. 1, in a normal state where no power supply failure occurs in a main power supply system, electric power output from the high-voltage DC/DC converter 4 is supplied to the main load 5 and the main battery 2. At the time of charging the backup battery 3, the electric power output from the high-voltage DC/DC converter 4 is supplied to the backup battery 3 via the control module 10.

Figure 2:
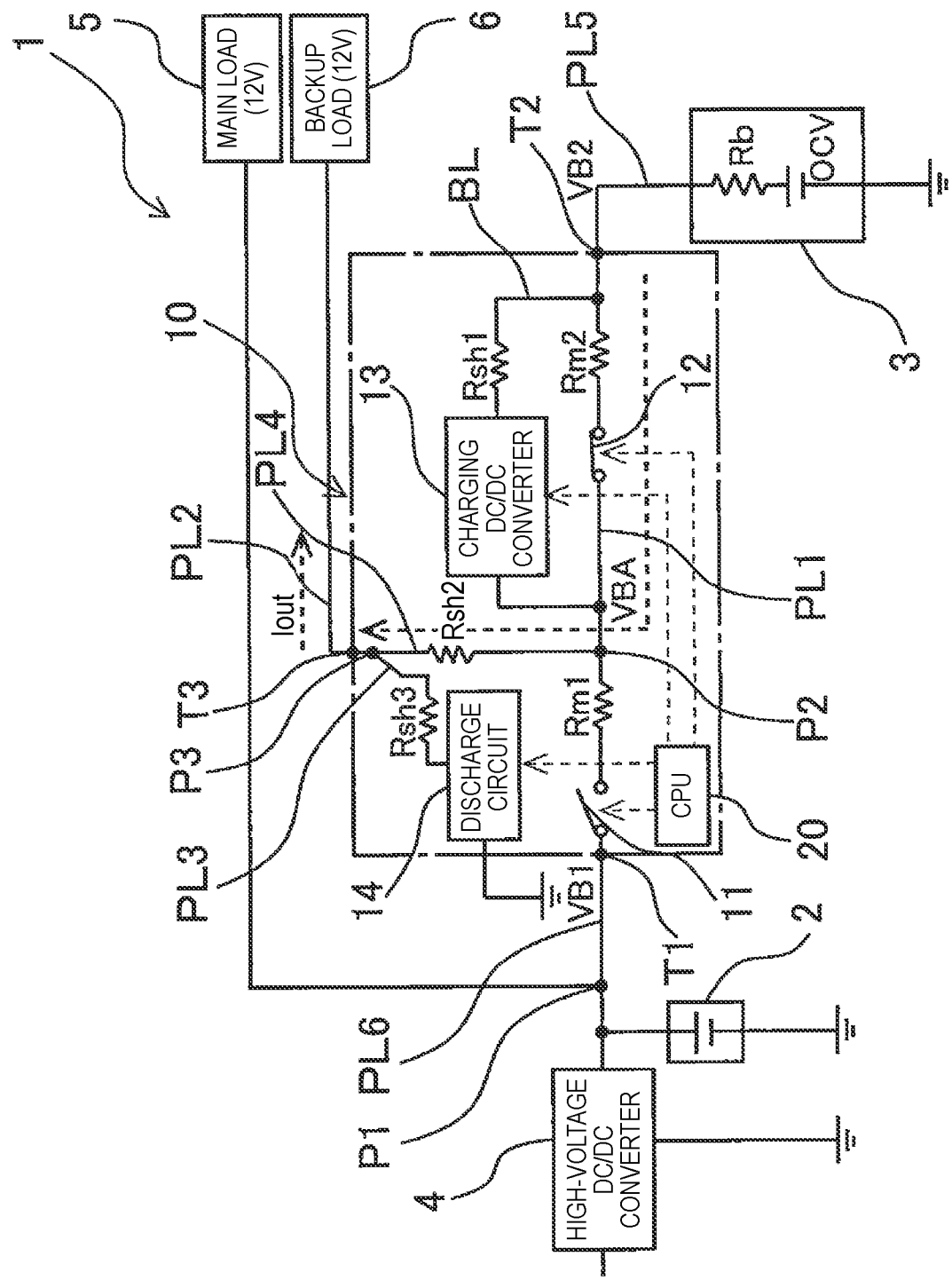
FIG. 2 is a diagram illustrating the in-vehicle power supply system including a control module according to the embodiment of the present disclosure.

On the other hand, as illustrated in FIG. 2, when a power supply failure occurs in the main power supply system, electric power is supplied from the backup battery 3 to the backup load 6. That is, charging and discharging of the backup battery 3 is controlled by the control module 10 such that: the backup battery 3 is charged by the electric power output from the high-voltage DC/DC converter 4 in the normal state where no power supply failure occurs in the main power supply system as illustrated in FIG. 1; and electric power is discharged from the backup battery 3 to the backup load 6 in a case in which a power supply failure occurs in the main power supply system as illustrated in FIG. 2.

The control module 10 includes a first switch 11, a second switch 12, a charging DC/DC converter 13, a discharge circuit 14, a central processing unit (CPU) 20 as an example of a control unit, and the power line PL1. The first switch 11 and the second switch 12 are provided on the power line PL1.

The first switch 11 is provided between the VB1 terminal T1 and a connection point P2 of the backup load 6. The first switch 11 is a transistor switch such as a metal oxide semiconductor field effect transistor (MOSFET). The first switch 11 is turned on in a normal state, where no power supply failure occurs in the main power supply system, to allow a current to flow from the high-voltage DC/DC converter 4 side to the backup battery 3 side, as illustrated in FIG. 1. On the other hand, the first switch 11 is turned off when a power supply failure occurs in the main power supply system to cut off a current flowing from the backup battery 3 side to the high-voltage DC/DC converter 4 side, as illustrated in FIG. 2.

The second switch 12 is provided on the power line PL1 between the connection point P2 of the backup load 6 and the VB2 terminal T2. The second switch 12 is a transistor switch such as a MOSFET. The second switch 12 is turned off when no power supply failure occurs in the main power supply system (at the time of charging the backup battery 3) to cut off a current flowing from the high-voltage DC/DC converter 4 side to the backup battery 3 side, as illustrated in FIG. 1. On the other hand, when a power supply failure occurs in the main power supply system (when the backup battery 3 discharges electric power) as illustrated in FIG. 2, the second switch 12 is turned on to allow a current to flow from the backup battery 3 side to the backup load 6 side.

The charging DC/DC converter 13 is connected to the power line PL1 in parallel with the second switch 12. In other words, the charging DC/DC converter 13 is provided on a bypass line BL that bypasses the second switch 12. A shunt resistor Rsh1 for a current sensor is provided on the bypass line BL.

As illustrated in FIG. 1, the charging DC/DC converter 13 converts the voltage output from the high-voltage DC/DC converter 4 and outputs the converted voltage to the backup battery 3. Here, a current flowing through the charging DC/DC converter 13 at the time of charging the backup battery 3 is a very small current of about 4 A, and an output capacity required for the charging DC/DC converter 13 is small. On the other hand, as illustrated in FIG. 2, the current output from the backup battery 3 to the backup load 6 is a large current of about 80 A.

As described above, the backup battery 3 discharging electric power to the backup load 6 is limited to cases such as one where a power failure occurs in the main power supply system, and the backup battery 3 seldom discharges electric power in a normal state where no power failure occurs in the main power supply system. Therefore, there are few opportunities to charge the backup battery 3. Therefore, in the present embodiment, the cost of the DC/DC converter is reduced by having a low-capacity charging DC/DC converter 13.

Figure 3:
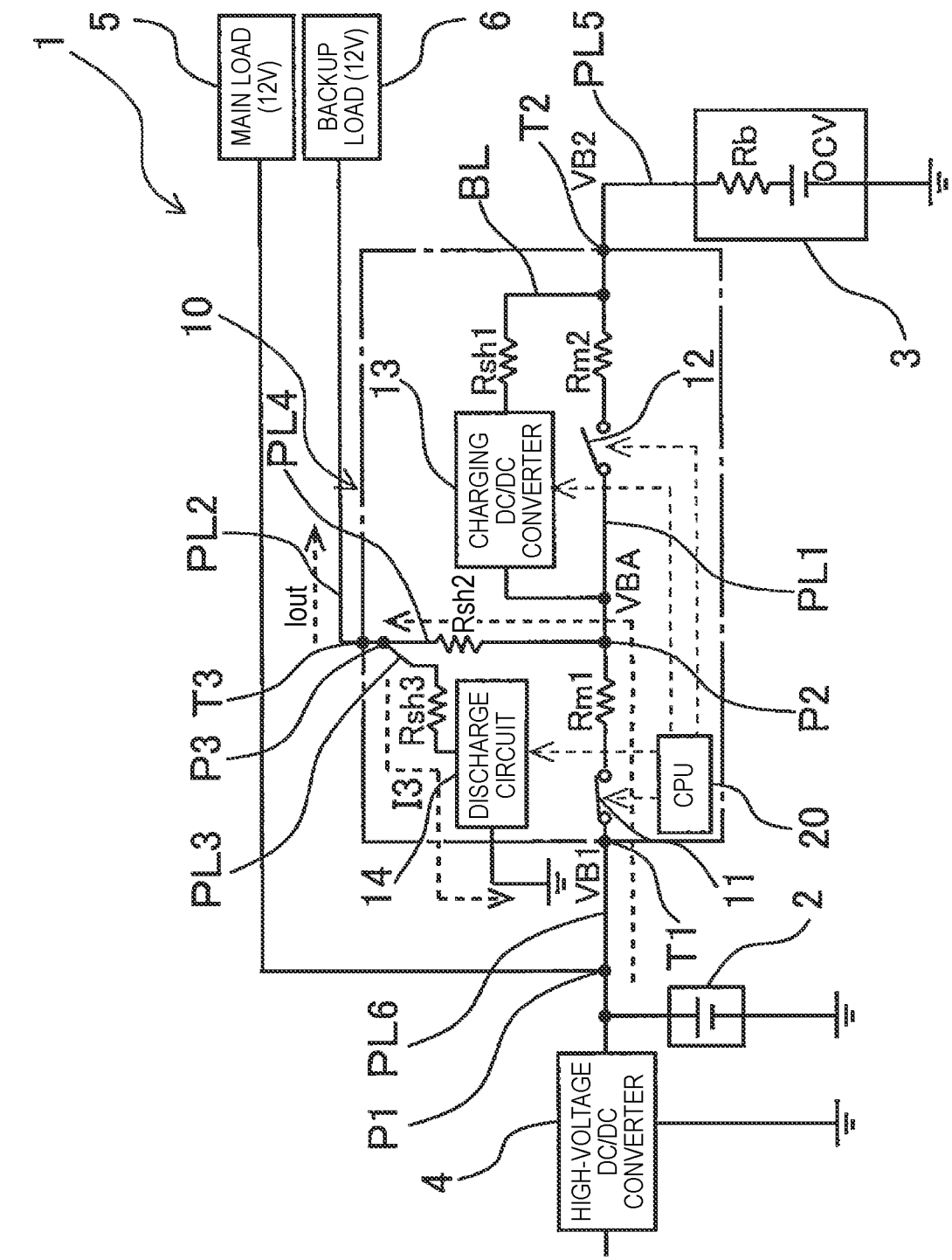
FIG. 3 is a diagram illustrating the in-vehicle power supply system including a control module according to the embodiment of the present disclosure.

The discharge circuit 14 is connected to a power line PL4, which connects the power line PL1 and a Vout terminal T3, via a power line PL3. The Vout terminal T3 is a terminal to which a power line PL2 connected to the backup load 6 is connected. The discharge circuit 14 includes a switch (not shown). When electric power is output from the high-voltage DC/DC converter 4 while the switch of the discharge circuit 14 is turned on, the first switch 11 is turned on, and the second switch 12 is turned off, a current flows from the power line PL3 to the discharge circuit 14 as illustrated in FIG. 3. A shunt resistor Rsh2 for a current sensor is provided on the power line PL4, between the connection point P2 and the connection point P3 of the power line PL3. In addition, a shunt resistor Rsh3 for a current sensor is provided on the power line PL3.

A CPU 20 controls the first switch 11, the second switch 12, the charging DC/DC converter 13, and the discharge circuit 14. For example, in a case where a power supply failure occurs in the main power supply system, such as one that an output voltage of the main battery 2 decreases to a predetermined value or less, the CPU 20 turns off the first switch 11 and turns on the second switch 12, as illustrated in FIG. 2.

Figure 4:
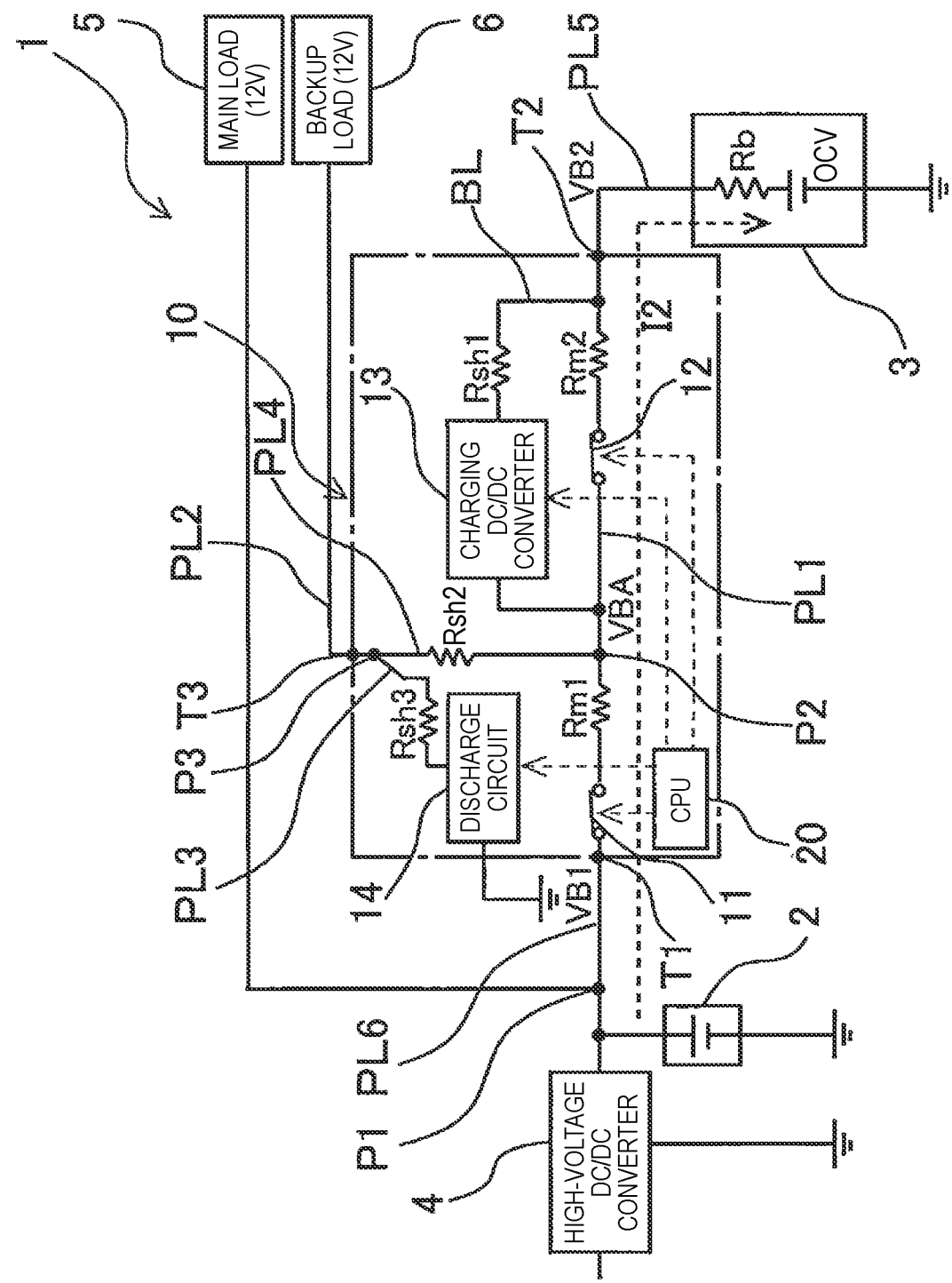
FIG. 4 is a diagram illustrating the in-vehicle power supply system including a control module according to the embodiment of the present disclosure.

Here, when charging the backup battery 3, the CPU 20 switches between a first charging path and a second charging path in accordance with current values I1 and I2 of charging currents. The first charging path is a charging path that passes through the charging DC/DC converter 13 as illustrated in FIG. 1, whereas the second charging path is a charging path that passes through the second switch 12 as illustrated in FIG. 4. The current value I1 of a charging current is a current value of a charging current flowing through the first charging path as illustrated in FIG. 1, and the current value I2 of a charging current is a current value of a charging current flowing through the second charging path as illustrated in FIG. 4. As illustrated in FIG. 1, the CPU 20 turns on the first switch 11 and turns off the second switch 12, thereby supplying the charging current of the current value I1 to the backup battery 3 via the charging DC/DC converter 13. On the other hand, as illustrated in FIG. 4, the CPU 20 turns on the first switch 11 and turns on the second switch 12, thereby supplying the charging current of the current value I2 to the backup battery 3 via the second switch 12. Further, at the time of starting the vehicle (immediately after the ignition is turned on), the CPU 20 executes processing for estimating the current value I2 of the charging current in the case of charging the backup battery 3 using the second charging path.

Figure 5:
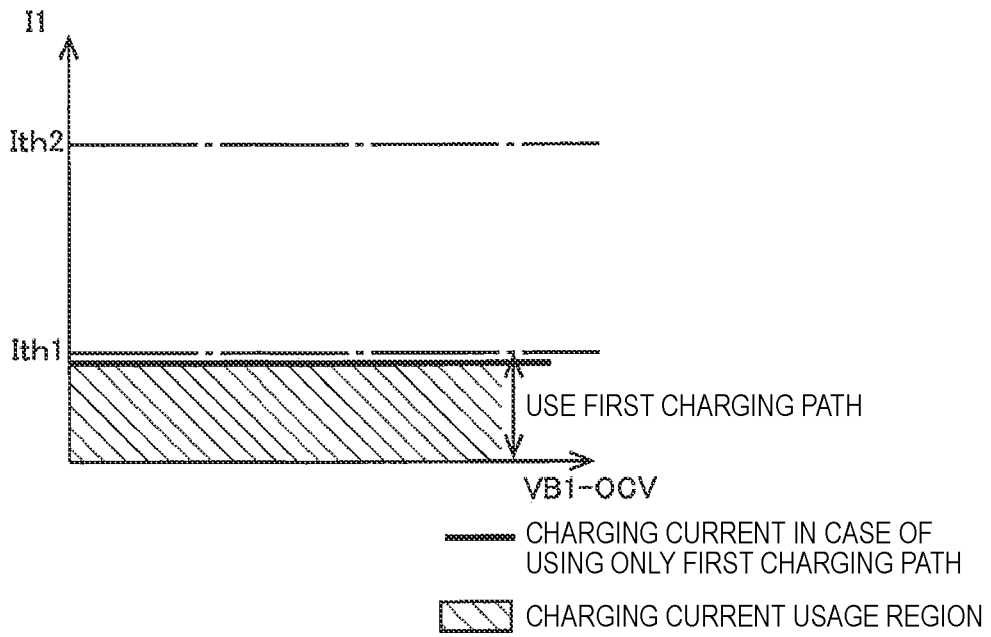
FIG. 5 is a graph illustrating a relationship between a voltage between a VB1 terminal and an internal portion of a backup battery and a current value of a charging current in a case of charging the backup battery using only the first charging path.
Figure 6:
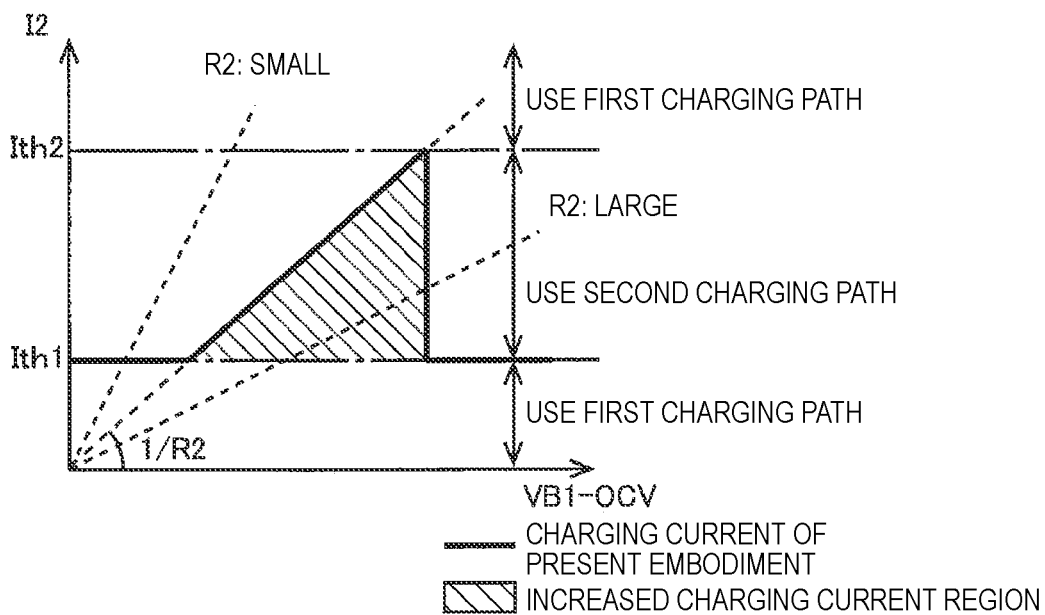
FIG. 6 is a graph illustrating a relationship between a voltage between the VB1 terminal and the internal portion of the backup battery and a current value of a charging current in a case of charging the backup battery using the first charging path and a second charging path.

FIG. 5 is a graph illustrating a relationship between a voltage (VB1-OCV) between the VB1 terminal T1 and an internal portion of the backup battery 3 and the current value I1 of the charging current in the case of charging the backup battery 3 using only the first charging path. Note that VB1 is a voltage output from the main battery 2 and input to the control module 10, and OCV is an open circuit voltage of the backup battery 3. FIG. 6 is a graph illustrating a relationship between the voltage (VB1-OCV) and the current value I2 of the charging current in a case of charging the backup battery 3 is charged using the first charging path and the second charging path.

As illustrated in the graph of FIG. 5, in the case of charging the backup battery 3 using only the first charging path, the current value I1 of the charging current is equal to or less than a maximum value Ith1 (an example of a first predetermined value) of an output current of the charging DC/DC converter 13 regardless of the voltage (VB1-OCV). That is, in the case of charging the backup battery 3 using only the first charging path, the current value I1 of the charging current decreases to be equal to or less than the maximum value Ith1 of the output current of the charging DC/DC converter 13 that has a low capacity for cost reduction.

In contrast, as illustrated in the graph of FIG. 6, in the case where the backup battery 3 is charged using not only the first charging path but also the second charging path, there is a situation in which the charging current of the current value I2 equal to or greater than Ith1 is supplied to the backup battery 3 using the second charging path, and thus the charging current is increased as compared with that in the case where the backup battery 3 is charged using only the first charging path.

Here, when the charging current of the current value I2 equal to or greater than Ith1 is supplied to the backup battery 3 using the second charging path, it is necessary to suppress the current value I2 of the charging current to be equal to or less than an allowable upper limit value of a current flowing through the control module 10 and to be equal to or less than an allowable upper limit value of the charging current of the backup battery 3. Therefore, the CPU 20 executes, at the time of starting the vehicle (immediately after the ignition is turned on), the processing for estimating the current value I2 of the charging current in the case of charging the backup battery 3 using the second charging path, and charges the backup battery 3 using the second charging path only when the current value I2 of the charging current estimated in the processing satisfies Ith1≤I2≤Ith2. Here, Ith2 (an example of a first predetermined value) is the smaller one of the allowable upper limit value of the current flowing through the control module 10 and the allowable upper limit value of the charging current of the backup battery 3. Hereinafter, estimation processing of estimating the current value I2 of the charging current will be described.

The current value I2 of the charging current in the case of charging the backup battery 3 using the second charging path is calculated using the following equation (1).

$$I2=(VB1-OCV)/R2 \tag{1}$$

R2 is calculated using the following equation (2).

$$R2=Rm1+Rm2+Rb \tag{2}$$

Rm1 and Rm2 are internal resistances of the control module 10 (see FIGS. 1 to 4). Rm1 is an internal resistance between the first switch 11 and the second switch 12, and Rm2 is an internal resistance between the second switch 12 and the VB2 terminal T2. In addition, Rb is an internal resistance of the backup battery 3.

The internal resistance Rb of the backup battery 3 is calculated using the following equation (3).

$$Rb=\alpha(VB2-OCV)/I1 \tag{3}$$

α is a conversion coefficient of the internal resistance Rb of the backup battery 3 that changes according to a discharge current, and is acquired in advance by performing a characteristic evaluation test of the battery.

I1 is the current value of the charging current supplied to the backup battery 3 in the case where the first charging path is used. In order to acquire the current value I1 of the charging current, the CPU 20 executes processing of causing a charging current to flow through the first charging path at the time of starting the vehicle and measuring the current value I1 with a current sensor.

The internal resistance Rm1 is calculated using the following equation (4).

$$Rm1=(VB1-VBA)/Iout \tag{4}$$

VBA is a voltage between the first switch 11 and the second switch 12 (see FIGS. 1 to 4). Iout is a current value of a current output from the Vout terminal T3 to the backup load 6 (see FIGS. 2 and 3). In order to acquire the current value Iout, the CPU 20 executes processing of causing a current to flow from the high-voltage DC/DC converter 4 to the backup load 6 via the power line PL4 at the time of starting the vehicle and measuring the current value Tout with a current sensor.

The internal resistance Rm2 is calculated using the following equation (5).

$$Rm2=(VB2-VBA)/I3 \qquad (5)$$

I3 is a current value of a current flowing through the discharge circuit 14 (see FIG. 3). In order to acquire the current value I3, the CPU 20 executes processing of causing a current to flow from the high-voltage DC/DC converter 4 to the discharge circuit 14 via the power lines PL6, PL1, PL4, and PL3 by turning on the first switch 11 and turning off the second switch 12 at the time of starting the vehicle and measuring the current value I3.

When the current value I2 of the charging current estimated in the estimation processing satisfies a relationship of I2<Ith1, I2>Ith2, the CPU 20 charges the backup battery 3 using the first charging path. On the other hand, when the current value I2 of the charging current estimated in the estimation processing satisfies a relationship Ith1≤I2≤Ith2, the CPU 20 charges the backup battery 3 using the second charging path.

As illustrated in the graph of FIG. 6, as a difference (VB1-OCV) between the voltage VB1 input to the control module 10 and the open circuit voltage OCV decreases, the internal resistance R2 decreases and a rate of increase in the charging current increases. In this case, time during which the backup battery 3 can be charged using the second charging path is shortened, the charging current decreases, and a longer charging time is required. In contrast, as the difference between the voltage VB1 input to the control module 10 and the open circuit voltage OCV increases, the internal resistance R2 increases and the rate of increase in the charging current decreases. In this case, the time during which the backup battery 3 can be charged using the second charging path is lengthened, the charging current increases, and a shorter charging time is required.

That is, in the present embodiment, by estimating the internal resistance R2 between the voltage VB1 input to the control module 10 and the open circuit voltage OCV inside the backup battery 3, it is possible to estimate, before starting charging the backup battery 3, the current value I2 of the charging current in the case of charging the backup battery 3 using the second charging path. When the estimated current value I2 of the charging current is included in a safe range according to a relationship between an allowable range of the current flowing through the control module 10 and an allowable range of the charging current of the backup battery 3, the backup battery 3 is charged using the second charging path. Accordingly, the charging current can be increased and the charging time can be shortened, as compared with the case where the backup battery 3 is charged using only the first charging path. Further, although the current value I2 of the charging current flowing through the second charging path varies due to the voltage VB1 input from the main battery 2 to the control module 10, the open circuit voltage OCV of the backup battery 3, and the like, it is possible to prevent the current value I2 from exceeding the allowable range of the current flowing through the control module 10 and the allowable range of the charging current of the backup battery 3. Therefore, by using a low-cost charging DC/DC converter 13, a cost of the control module 10 can be reduced, and charging of the backup battery 3 can be performed safely and finished in a short time.

Although the present disclosure has been described based on the embodiment, the present disclosure is not limited to the embodiment described above. The present disclosure may be modified as appropriate without departing from the scope of the present disclosure, or known and well-known techniques may be combined as appropriate.

For example, in the above embodiment, the discharge circuit 14 is provided and electric power is discharged from the backup battery 3 to the discharge circuit 14, and the current value I2 of the charging current is calculated based on the current value I3 of the current flowing through the discharge circuit 14. Alternatively, the current value I2 of the charging current may be calculated using another method.

The invention claimed is:

1. A power supply control apparatus in a power supply system comprising a power supply unit, a main power supply, and a backup power supply, the power supply control apparatus connecting the power supply unit, the main power supply, and the backup power supply and controls charging and discharging of the backup power supply, the power supply control apparatus comprising:
   a power line to which the power supply unit, the main power supply, the backup power supply, and a backup load are connected;
   a first switch provided on the power line and configured to turn on and off connection between the power supply unit as well as the main power supply and the backup power supply;
   a second switch provided on the power line and configured to turn on and off connection between the backup power supply and the backup load;
   a charging DC/DC converter connected to the power line in parallel with the second switch and configured to convert a voltage supplied from a power supply unit side and supply a converted voltage to a backup power supply side; and
   a control unit configured to execute:
      discharge control of turning off the first switch and turning on the second switch to discharge electric power from the backup power supply to the backup load;
      first charge control of turning on the first switch and turning off the second switch to charge the backup power supply via the charging DC/DC converter; and
      second charge control of turning on the first switch and turning on the second switch to charge the backup power supply via the second switch,
   wherein in charging the backup power supply, the control unit is configured to execute the second charge control only in a case in which a current value of a charging current is equal to or greater than a first predetermined value and equal to or less than a second predetermined value that is greater than the first predetermined value.

2. The power supply control apparatus according to claim 1, further comprising:
   a discharge circuit provided between the second switch and the backup load,
   wherein the control unit is configured to execute discharge processing of turning on the first switch and turning off the second switch to discharge electric power from the power supply unit through the discharge circuit, and calculate the current value of the charging current based on a current value of a current flowing through the discharge circuit during execution of the discharge processing, a current value of a current output to the backup load, a current value of a current flowing through the backup power supply during execution of the first charge control, a voltage and an open circuit voltage of the backup power supply, and a voltage between the first switch and the second switch.

3. The power supply control apparatus according to claim 1,
wherein the first predetermined value is set to a maximum value of an output current of the charging DC/DC converter, and
wherein the second predetermined value is set to a smaller one of a maximum value of a current flowing through the power supply control apparatus and a maximum value of a charging current in the backup power supply.

4. The power supply control apparatus according to claim 1,
wherein the control unit is configured to calculate the current value of the charging current based on a sum of an internal resistance of the backup power supply and an internal resistance from a first terminal to which the power supply unit and the main power supply are connected to a second terminal to which the backup power supply is connected.

* * * * *